United States Patent
Piirainen et al.

[19]

[11] Patent Number: 6,144,709
[45] Date of Patent: Nov. 7, 2000

[54] METHOD OF DETECTING A CALL SET-UP BURST, AND A RECEIVER

[75] Inventors: Olli Piirainen; Kari Jyrkkä, both of Oulu, Finland

[73] Assignee: Nokia Telecommunications Oy, Espoo, Finland

[21] Appl. No.: 09/091,978

[22] PCT Filed: Dec. 23, 1996

[86] PCT No.: PCT/FI96/00697

§ 371 Date: Jun. 26, 1998

§ 102(e) Date: Jun. 26, 1998

[87] PCT Pub. No.: WO97/24819

PCT Pub. Date: Jul. 10, 1997

[30] Foreign Application Priority Data

Dec. 29, 1995 [FI] Finland .................................. 956360

[51] Int. Cl.[7] .............................. H03D 1/00; H04L 27/06
[52] U.S. Cl. ........................................... 375/343; 375/150
[58] Field of Search .................... 375/150, 343; 370/345, 458

[56] References Cited

U.S. PATENT DOCUMENTS

| | | | |
|---|---|---|---|
| 5,228,057 | 7/1993 | Larsson | 375/14 |
| 5,373,507 | 12/1994 | Skold | 370/105.1 |
| 5,838,672 | 11/1998 | Ranta | 370/335 |
| 5,912,932 | 6/1999 | Calderbank et al. | 375/346 |
| 5,917,856 | 6/1999 | Torsti | 375/231 |

FOREIGN PATENT DOCUMENTS 0709975  5/1996  European Pat. Off. .

*Primary Examiner*—Don N. Vo
*Assistant Examiner*—Phoung Phu
*Attorney, Agent, or Firm*—Altera Law Group, LLC

[57] ABSTRACT

A method of detecting a call set-up burst, and a receiver, in a digital radio system, the receiver comprising a converter (304) for sampling a signal received in a given time slot, means (400) for correlating digitalized samples with a known training sequence, and means (402) for computing the energy of the correlation results obtained, means (404) for looking for the maximum values of a string of samples of a given order from the computed energies, and means (408) for averaging the maximum values found per one sample. To improve reliability of detecting a call set-up burst, the receiver comprises means (410) for averaging the energy of the other samples of the time slot per one sample, and means (412) for comparing the averaged maximum energy values with the energy values of the other samples.

5 Claims, 1 Drawing Sheet

METHOD OF DETECTING A CALL SET-UP BURST, AND A RECEIVER

FIELD OF THE INVENTION

The invention relates to a method of detecting a call set-up burst in a digital radio system in which a call is set up in a predetermined time slot by a certain call set-up burst which comprises a known training sequence; in the method, the position and energy of the maximum point of an impulse response in a time slot are estimated by correlating a sampled, received signal with a known training sequence and by computing the average energy of the maximum point of the impulse response per one correlation result.

BACKGROUND ART

The present invention can be applied in digital radio systems in which subscriber equipments send a specific call set-up message when they want to establish a radio connection with a base station and in which the call set-up message comprises a training sequence. Typically, a call set-up message is sent on a random access channel, which means that message transmission does not have an exact predetermined starting and ending moment. It is typical of a random access channel that transmissions on the channel may coincide and so a transmission may have to be repeated. The base station does not know when the terminal equipments need to communicate, and so it cannot allocate them turns to transmit beforehand.

Detection of a call set-up message at a base station is demanding, since the base station does not know beforehand the moment when a signal will arrive, the power level of the signal, or its possible frequency deviation from the nominal frequency of the call set-up channel. To facilitate detection of a message, the message usually contains a number of previously known bits, a sequence of previously known bits being called a training sequence. A training sequence is commonly used in digital radio systems, since it can be used in computing the properties of the channel, such as an impulse response, by which one can attempt to correct any distortions that the channel may cause in a signal.

In prior art solutions, a decision whether or not a signal received in a given time slot comprises a call set-up message is made after an equalizer when an decoded assumed training sequence is compared with a known training sequence. If there are many error bits, the signal has probably contained noise rather than a message. Call set-up should be rendered as quick and reliable as possible, since this adds to user comfort. The quicker a call set-up message can be detected, the quicker a call can be set up between a base station and a terminal equipment.

DESCRIPTION OF THE INVENTION

The object of the present invention is to provide a method by which a call set-up message can be detected earlier than before. The method provided by the invention is also reliable, and it can be used either as such or in combination with other methods.

The object is achieved by a method described in the introduction, the method being characterized by averaging the energy contained in the correlation results of the other samples of the time slot per one correlation result, computing the ratio between the averaged maximum energy of the impulse response and the average energy of the other samples of the time slot, and if the ratio is higher than a given threshold, deciding that a call set-up burst was received in the time slot concerned.

The invention also relates to a receiver of a digital radio system, the receiver comprising a converter for sampling a signal received in a given time slot, means for correlating digitalized samples with a known training sequence, and means for computing the energy of the correlation results obtained, means for looking for the maximum values of a string of samples of a given order from the computed energies, and means for averaging the maximum values found per one sample. The receiver provided by the invention is characterized in that the receiver comprises means for averaging the energy of the other samples of the time slot per one sample, and means for comparing the averaged maximum energy values with the energy values of the other samples.

The method of the invention is simple and quick to implement, since most computing needed, i.e. computation of correlations, is carried out in any case in connection with computation of the impulse response. In addition, the method of the invention adapts to the channel, since the point of comparison is not a fixed signal noise ratio threshold as before but the ratio of the maximum energy to the average energy of the other taps, the ratio adapting to the state of the channel.

DESCRIPTION OF THE FIGURES

In the following the invention will be described in greater detail with reference to the examples illustrated in the attached drawings, in which.

DESCRIPTION OF THE PREFERRED EMBODIMENTS

Figure 1:
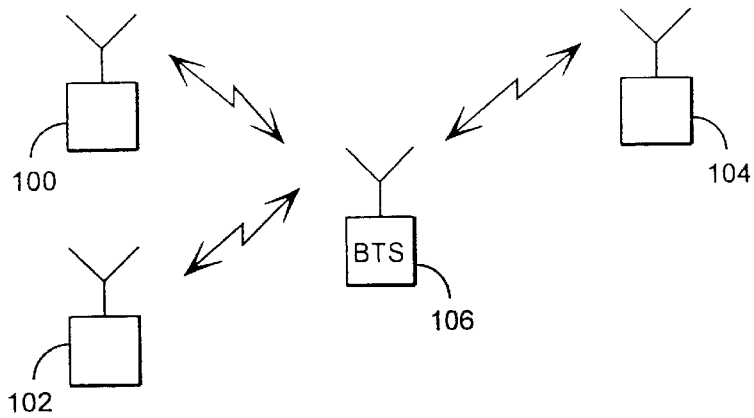
FIG. 1 illustrates a radio system in which a method provided by the invention can be applied.

The present invention can be generally applied in any digital radio system in which a subscriber equipment sets up a call by sending a special call setup message to a base station and in which the call setup message comprises a previously known bit sequence, i.e. a training sequence. FIG. 1 illustrates the structure of a typical radio system. The system comprises a plural number of subscriber equipments 100–104 which either communicate with the system within the area of a base station 106, like terminal equipment 100 shown in the figure, or are idle, like equipments 102 and 104. In the following the invention will be exemplified in a digital GSM cellular radio system, but the invention is not limited thereto.

A specific random access channel RACH is used in the GSM to set up a call from a terminal equipment to a base station. When a terminal equipment wants to establish a radio connection, it sends a call set-up message to a base station, which forwards it to the system, in which resources are allocated for the connection. In the GSM, a 'slotted ALOHA protocol' is used for setting up a call. This means that a certain time slot is allocated for a call set-up message, and terminal equipments can send a message to a base station in that particular time slot. The system cannot possibly know when the terminal equipments want to communicate, so the first message of a terminal equipment to a base station cannot be coordinated. Further, the terminal equipments do not know the length of the propagation delay of the signal, so messages arrive randomly within a given time slot, and it is also possible that messages from a plural number of terminal equipments coincide.

Figure 2:
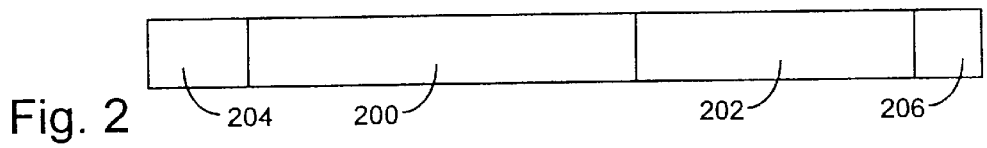
FIG. 2 shows the structure of a call set-up burst used in the GSM system.

Since the base station does not know beforehand the moment when a signal will arrive, the power level of the signal, or its possible frequency deviation from the nominal frequency of the call set-up channel, detection of a message is demanding, and yet it should be conducted quickly and reliably. In order that it would be easier to decode a message, a training sequence in a call set-up message is longer than in the other messages of the GSM. The structure of a GSM call set-up message is illustrated in FIG. 2.

A call set-up message comprises a 41-bit long training sequence 200, 36 information bits 202, 7 start bits 204 and 3 end bits 206. In a call set-up message, one known training sequence is used. The total length of the message is thus 87 bits, as compared with a normal traffic bit, which is 147 bits. Since the propagation delay of the message is not known at the moment of transmission, the message will arrive at a base station, randomly delayed, within the time slot allocated for the purpose. Since the message is short as compared with the length of the time slot, which is equally long as in connection with normal messages, the terminal equipment can send the message within the time slot even when it is located far from the base station.

A call set-up message may arrive at a base station with a delay of as many as 64 bits, counted from the beginning of the time slot. The message may thus be located in 64 different positions in a time window. A base station receiver correlates a signal received in the time slot with a known training sequence in order to measure the impulse response. The correlation can be effected by defining the first 42 bits of the time slot—i.e. the length of a training sequence—as a time window, correlating them with a known training sequence, displacing the time window by one bit and correlating again, and repeating this a desired number of times, for example until the time slot has been gone through. The number of the correlation results obtained is here N. The results can be called taps.

To define the position of a message, the energy $E_{tot}$ of the received correlation results is computed by squaring the results obtained. The maximum point of energy is then computed with the help of a time window M of a given size. Typically, the size of the window is M=5, whereby five squared taps are taken at a time, their energies are summed, the window is displaced by one tap, and the total energy is computed again. All the taps are gone through, and the position of maximum energy $E_{max}$ is obtained. The time window with the greatest energy is taken as the impulse response of the channel. The energy of the impulse response is averaged per one tap, i.e. divided by the number M of taps contained in the time window. The average energy $E_{ave}$ is thus obtained.

In the method provided by the invention, the average energy of the other taps, $E_{ave-rest}$, is then computed, the energy being obtained, for example, by computing $E_{tot}-E_{max}$ and averaging the result per one tap such that the result is divided by the number of taps minus the number of taps contained in the time window, i.e. by N–M.

In the method of the invention, a decision on whether a real call set-up message was received in the time slot can be made by computing the energy ratio $E_{ave}/E_{ave-rest}$ and comparing the ratio with a given threshold value. If the ratio is greater than the predefined threshold, it can be assumed that a call set-up message has been received. If, on the other hand, the ratio is smaller than the threshold, no message has been received. The correct value of the threshold can be defined system-specifically by means of measurements and simulations.

Since the computationally most significant part, i.e. computation of correlations, is carried out in any case, implementation of a method provided by the invention requires only a few time slots in a receiver.

Another advantage of the solution provided by the invention is that the ratio of the taps with the maximum energy to the average energy of the other taps always adapts to the channel. In prior art methods, a fixed signal noise ratio has been used as a threshold value. Practice has shown that if a channel is loaded, i.e. has several simultaneous connections, the signal noise ratio threshold is easily surpassed. In the method provided by the invention, both the maximum and the energy of the other taps with which it is compared are within a single burst, so the ratio measured adapts to the channel. The ratio is approximately a constant irrespective of the channel load. Although the measure of the ratio is a predefined threshold value, comparison is made such that any changes on the channel can be adapted to.

Figure 3:
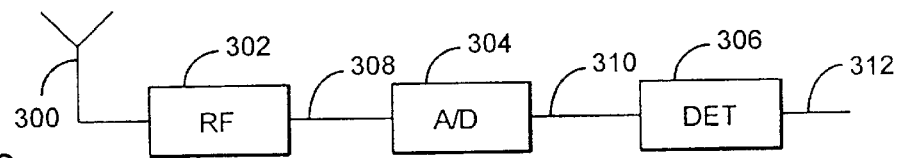
FIG. 3 is a block diagram illustrating the structure of a receiver provided by the invention.

We shall now study an example of the structure of a receiver provided by the invention on the basis of the block diagram shown in FIG. 3. The receiver comprises an antenna 300, which supplies a received signal to radio frequency parts 302, in which the signal is converted to an intermediate or baseband frequency. From the radio frequency parts the signal 308 is forwarded to a converter 304, in which the signal is converted in accordance with a known technique to digital form by sampling it. The digitalized signal 310 is forwarded to a detector block 306, in which the signal is detected. From the detector, the signal 312 is forwarded to other parts of the receiver. It is obvious to a person skilled in the art that the receiver to be implemented naturally also comprises other components, such as filters, but since they are not essential to the current invention, they are not described herein.

Figure 4:
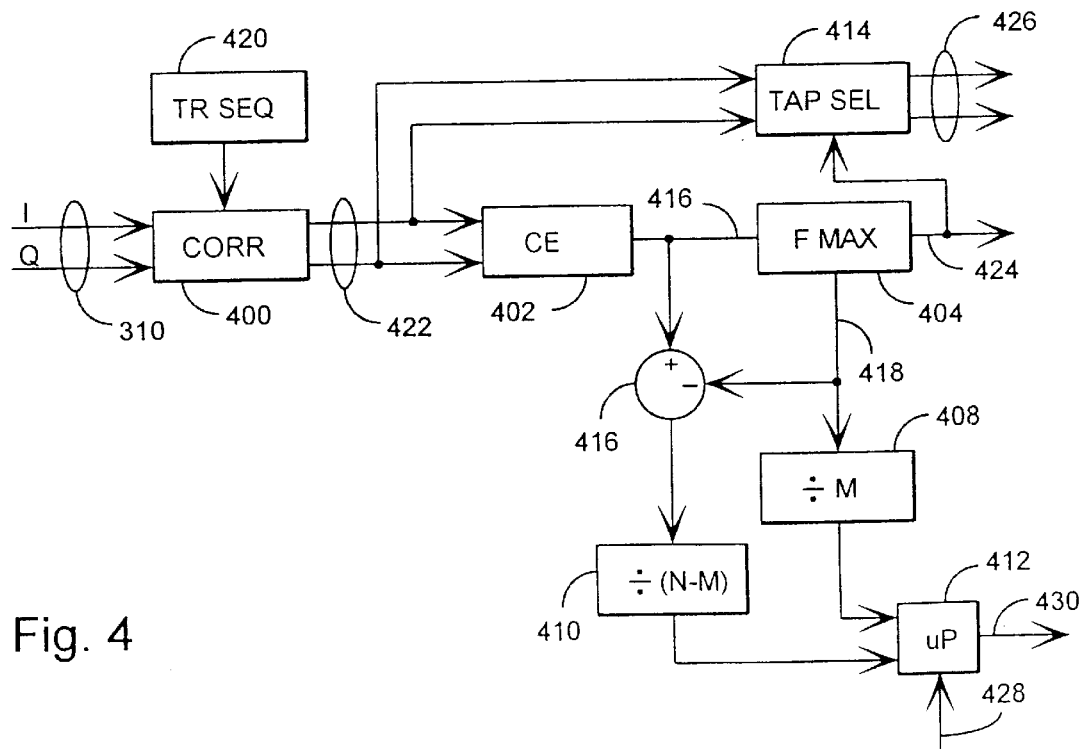
FIG. 4 illustrates the structure of a receiver provided by the invention in greater detail.

Let us now study in greater detail the structure and operation of the detector block 306 of the receiver provided by the invention from the point of view of message detection and with the help of the block diagram shown in FIG. 4. In the block is inputted a sampled signal 310, which may comprise separate I and Q branches. The signal is supplied to a correlator 400 according to the prior art, in which a known training sequence 420 is also inputted. From the output of the correlator are obtained real and imaginary taps, which are forwarded to computation means 402, in which the energy of the taps is computed. The energy can be computed by squaring. Squared taps 416 are forwarded to computation means 404, in which the maximum point of the taps in a given window is looked for, the maximum point typically being M=5 taps. The maximum point found indicates the position of the impulse response.

Correlation results 422 obtained from the correlator 400 are also supplied to a processor 414, to which is supplied information on the maximum point 424. The processor selects taps 426 contained in the maximum energy and forwards them to the other parts of the receiver.

The maximum energy 418 found in computation means 404 is forwarded to averaging means 408, in which the energy is divided by the number M of taps used in the computation. Correspondingly, the maximum energy 418 is supplied to computation means 406, in which the total energy 416 computed is also inputted and in which the maximum energy is subtracted from the total energy. The so obtained energy of the other taps than those contained in the impulse response is supplied to averaging means 410, in which the energy is averaged per one tap, i.e. divided by the number of taps N–M.

The averaged energies are supplied from means 408 and 410 to processing means 412, in which the ratio of the energies is computed and then compared with a preset threshold value 428. A decision 430 whether or not a message was received in the time slot concerned is supplied to the other parts of the receiver.

Although the invention is described above with reference to an example illustrated in the attached drawings, it is to be understood that the invention is not limited thereto but can be varied in many ways within the scope of the inventive idea disclosed in the attached claims.

What is claimed is:

1. A method of detecting a call set-up burst in a digital radio system in which a call is set up in a predetermined time slot by a certain call set-up burst which comprises a known training sequence (200); in the method, the position and energy of the maximum point of an impulse response in a time slot are estimated by correlating a sampled, received signal with a known training sequence and by computing the average energy of the maximum point of the impulse response per one correlation result, characterized by averaging the energy contained in the correlation results of the other samples of the time slot per one correlation result, computing the ratio between the averaged maximum energy of the impulse response and the average energy of the other samples of the time slot, and if the ratio is higher than a given threshold, deciding that a call set-up burst was received in the time slot concerned.

2. A method according to claim 1, characterized in that at the beginning of each time slot allocated for transmission of a call set-up burst, the received sampled signal is correlated with a known training sequence of a string of samples, the string of samples is displaced by a desired number of samples and is correlated again, until the desired time slot has been studied and a number of correlation results are obtained;

and that the correlation results are squared, and the maximum value of a sum of certain consecutive results is looked for in the squared correlation results, the maximum value being used as the energy value of the impulse response of the channel, and the value obtained is averaged by dividing it by the number of consecutive results used in the computation.

3. A method according to claim 2, characterized in that the energy contained in the correlation results of the other samples of the time slot is computed by summing the squared correlation results; and that the so obtained total energy is averaged per one correlation result by dividing the value obtained by the number of correlation results used in the computation.

4. A receiver in a digital radio system, the receiver comprising a converter (304) for sampling a signal received in a given time slot, means (400) for correlating digitalized samples with a known training sequence, and means (402) for computing the energy of the correlation results obtained, means (404) for looking for the maximum values of a string of samples of a given order from the computed energies, and means (408) for averaging the maximum values found per one sample, characterized in that the receiver comprises means (410) for averaging the energy of the other samples of the time slot per one sample, and means (412) for comparing the averaged maximum energy values with the energy values of the other samples.

5. A receiver according to claim 4, characterized in that the receiver comprises means (406) for subtracting the maximum values of the string of samples of a given size from all the squared samples.

* * * * *